United States Patent
Nishimoto (10) Patent No.: US 7,291,787 B2
(45) Date of Patent: Nov. 6, 2007

(54) BICYCLE ELECTRICAL WIRE COVER APPARATUS

(75) Inventor: Naohiro Nishimoto, Hashimoto (JP)

(73) Assignee: Shimano, Inc., Sakai, Osaka (JP)

( * ) Notice: Subject to any disclaimer, the term of this patent is extended or adjusted under 35 U.S.C. 154(b) by 245 days.

(21) Appl. No.: 11/160,833

(22) Filed: Jul. 12, 2005

(65) Prior Publication Data

US 2006/0046548 A1    Mar. 2, 2006

(30) Foreign Application Priority Data

Aug. 24, 2004    (JP)    ............................. 2004-243761

(51) Int. Cl.
*H01B 7/06*    (2006.01)

(52) U.S. Cl. .................. 174/136; 248/74.5; 174/163 R (58) Field of Classification Search ............ 174/163 R, 174/135, 136, 138 R, 40 CC, 175, 170, 172, 174/167, 168; 248/68.1, 72, 73, 74.3, 74.5
See application file for complete search history.

(56) References Cited

U.S. PATENT DOCUMENTS

| | | | | | |
|---|---|---|---|---|---|
| 2,936,981 | A | * | 5/1960 | Aversten ..................... | 248/74.5 |
| 3,893,647 | A | * | 7/1975 | Kennedy ..................... | 248/68.1 |
| 3,954,238 | A | * | 5/1976 | Nivet ......................... | 248/68.1 |
| 4,669,156 | A | * | 6/1987 | Guido et al. ................. | 24/336 |
| 4,775,121 | A | * | 10/1988 | Carty ......................... | 248/68.1 |
| 4,970,351 | A | * | 11/1990 | Kirlin ......................... | 174/68.3 |
| 5,263,671 | A | * | 11/1993 | Baum ......................... | 248/68.1 |
| 5,568,905 | A | * | 10/1996 | Smith, II ..................... | 248/65 |
| 5,613,655 | A | * | 3/1997 | Marion ....................... | 248/68.1 |
| 5,962,814 | A | * | 10/1999 | Skipworth et al. .......... | 174/135 |
| 6,354,545 | B1 | * | 3/2002 | Liao ........................... | 248/214 |
| 6,835,069 | B2 | * | 12/2004 | Kitamura et al. ............. | 439/34 |
| 6,862,949 | B2 | * | 3/2005 | Hanamura .................. | 74/502.6 |
| 2006/0022425 | A1 | * | 2/2006 | Nishimoto .................. | 280/260 |

FOREIGN PATENT DOCUMENTS

| | | |
|---|---|---|
| DE | 1959956 U | 5/1967 |
| DE | 29708659 U1 | 7/1997 |
| EP | 1394031 A2 | 3/2004 |
| EP | 1426277 A2 | 6/2004 |
| JP | 2000-302074 A | 10/2000 |
| JP | 2001-213385 A | 8/2001 |
| JP | 2004-017785 A | 1/2004 |

* cited by examiner

*Primary Examiner*—Neil Abrams
(74) *Attorney, Agent, or Firm*—James A. Deland (57) ABSTRACT

A bicycle frame member (102*c*) includes a wire support (13) fixed thereto and formed as a bracket or coupler to receive and retain an electrical wire unit (EW2, 11*a*). An apparatus (15) is used to at least partially cover the wire support (13) and comprises a wire support cover member (15*b*) that is integrally formed with a locking unit (15*f*). The wire support cover member (15*b*) is to be placed onto the frame member and over the wire support (13) and the locking unit is to become locked to one of the wire support (13) and the electrical wire unit (EW2, 11*a*). The electrical wire unit may include electrical wiring (EW2) and a rigid cover member (11*a*).

15 Claims, 13 Drawing Sheets

BICYCLE ELECTRICAL WIRE COVER APPARATUS

BACKGROUND OF THE INVENTION

The present invention is directed to bicycles and, more particularly, to a bicycle electrical wire apparatus.

Bicycles sometimes are equipped with various electrical devices that are distributed along the bicycle frame and are interconnected through appropriate wiring. Such a bicycle is disclosed in U.S. Pat. No. 6,835,069. It is preferable to secure the wiring to the frame so that the wiring does not hang loose and pose a hazard. One method of securing the wiring to the frame is to pass the wiring through the inside of the frame tubes. Such a method makes it possible to obtain a clean external appearance. However, not only is a special structure required to pass the electrical wiring through the inside of the frame tubes, but passing the electrical wiring through the inside of the frame tubes is time-consuming. The special frame structure and the labor intensive nature of passing the wiring through the frame tubes undesirably increases the cost of the bicycle.

Another method of securing the wiring to the frame is simply to attach the wiring to the bicycle frame with a wire band that surrounds the adjacent frame tube so as to hold the wiring against the frame. Such a method is easy, thus making it possible to reduce the cost of the wiring operations. However, the wire bands, since they surround the entire frame tube, tend to clutter and detract from the appearance of the bicycle.

SUMMARY OF THE INVENTION

The present invention is directed to various features of a bicycle electrical wire cover apparatus. In one embodiment, a bicycle electrical wire cover apparatus is provided for at least partially covering an electrical wire unit that is coupled to a wire support disposed on a frame of a bicycle. The apparatus comprises a wire support cover member and a locking unit. The wire support cover member is structured to at least partially cover the wire support, and the locking unit is integrally formed with the wire support cover member. The locking unit is structured to be locked to one of the wire support and the electrical wire unit. Additional inventive features will become apparent from the description below, and such features alone or in combination with the above features may form the basis of further inventions as recited in the claims and their equivalents.

DETAILED DESCRIPTION OF THE EMBODIMENTS

Figure 1:
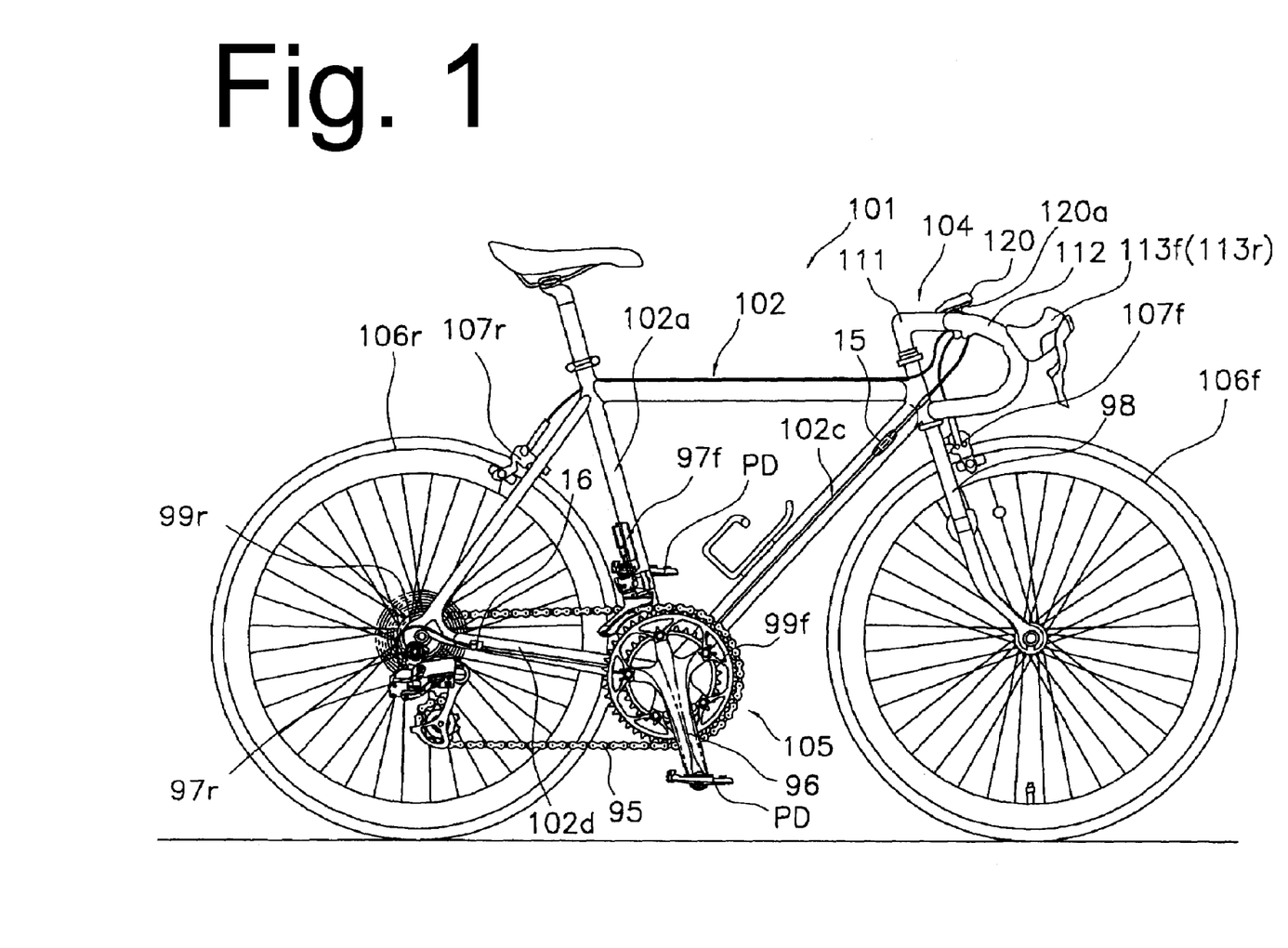
FIG. 1 is a side view of a particular embodiment of a bicycle.

FIG. 1 is a side view of a bicycle 101 that includes particular embodiments of electrically controlled components. Bicycle 101 is a road bicycle comprising a diamond-shaped frame 102, a front fork 98 rotatably mounted to frame 102, a handlebar assembly 104 mounted to the upper part of fork 98, a front wheel 106f rotatably attached to the lower part of fork 98, a rear wheel 106r rotatably attached to the rear of frame 102, and a drive unit 105. A front wheel brake 107f is provided for braking front wheel 106f, and a rear wheel brake 107r is provided for braking rear wheel 106r.

Drive unit 105 comprises a chain 95, a front sprocket assembly 99f coaxially mounted with a crank 96 having pedals PD, an electrically controlled front derailleur 97f attached to a seat tube 102a of frame 102, a rear sprocket assembly 99r coaxially mounted with rear wheel 106r, and an electrically controlled rear derailleur 97r. In this embodiment, front sprocket assembly 99f comprises two sprockets mounted coaxially with crank 96, and rear sprocket assembly 99r comprises ten sprockets mounted coaxially with rear wheel 106r. Front derailleur 97f moves to two operating positions to switch chain 95 between the two front sprockets, and rear derailleur 97r moves to ten operating positions to switch chain 95 among selected ones of the ten rear sprockets.

Figure 2:
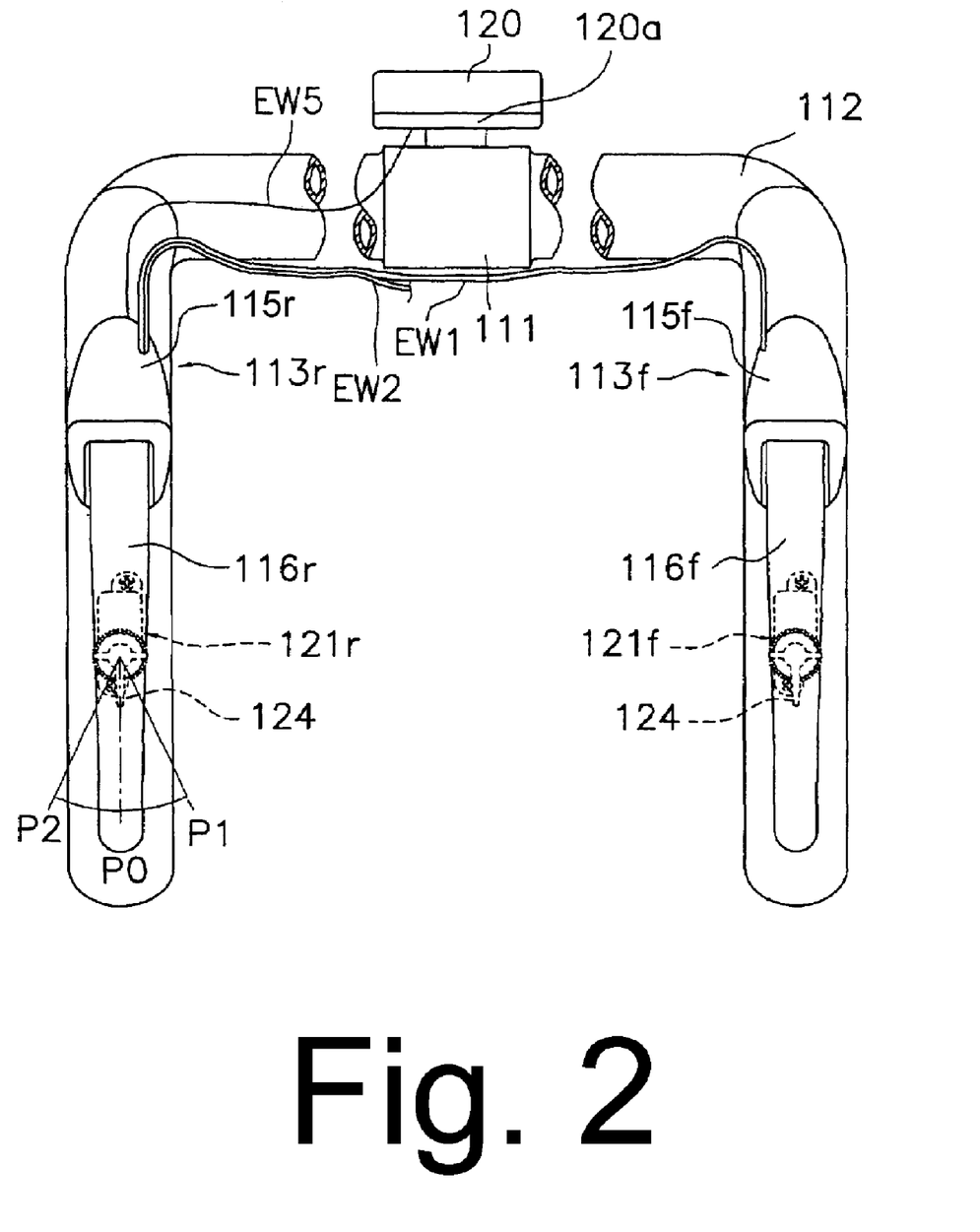
FIG. 2 is a front view of a particular embodiment of components mounted to the bicycle handlebar.

Handlebar assembly 104 comprises a handlebar stem 111 and a drop-style handlebar 112, wherein handlebar stem 111 is mounted to the upper part of fork 98, and handlebar 112 is mounted to the forward end portion of handlebar stem 111. As shown in FIG. 2, brake lever assemblies 113f and 113r are mounted at opposite sides of handlebar 112. Brake lever assembly 113f controls the operation of front wheel brake 107f, and brake lever assembly 113r controls the operation of rear wheel brake 107r. A display unit 120 is detachably mounted to a display bracket 120a attached to a central portion of handlebar 112. Display unit 120 displays the speed of the bicycle, distance traveled, gear position, etc. in a known manner.

Brake lever assemblies 113f and 113r comprise respective brake brackets 115f and 115r mounted to the forward curved portions of handlebar 112, and respective brake levers 116f and 116r pivotably mounted to brake brackets 115f and 115r.

A rear shift control device 121r with a switch lever 124 is mounted to the rear side of brake lever 116r so that the rider may control the operation of rear derailleur 97r with the hand grasping brake lever 116r. The switch lever 124 mounted to the rear of brake lever 116r rotates laterally inward from a home position P0 to a first position P1 and rotates laterally outward from home position P0 to a second position P2 to control the operation of rear derailleur 97r. Similarly, a front shift control device 121f with a switch lever 124 is mounted to the rear side of brake lever 116f so that the rider may control the operation of front derailleur 97f with the hand grasping brake lever 116f. The switch lever 124 mounted to the rear of brake lever 116f also rotates laterally inward from a home position P0 to a first position P1 and rotates laterally outward from home position P0 to a second position P2 to control the operation of front derailleur 97f. The levers 124 in front shift control device 121f and rear shift control device 121r are biased to their respective home positions P0.

A front upshift switch 130f (FIG. 4) and a front downshift switch 131f are mounted in front shift control device 121f. Front upshift switch 130f operates when switch lever 124 in front shift control device 121f rotates from position P0 to position P1, and front downshift switch 131f operates when switch lever 124 in front shift control device 121f rotates from position P0 to position P2. Similarly, a rear upshift switch 130r and a rear downshift switch 131r are mounted in rear shift control device 121r. Rear upshift switch 130r operates when switch lever 125 in rear shift control device 121r rotates from position P0 to position P1, and rear downshift switch 131r operates when switch lever 124 in rear shift control device 121r rotates from position P0 to position P2. Of course, many different switch combinations that operate in many different ways may be provided to suit different applications.

Figure 3:
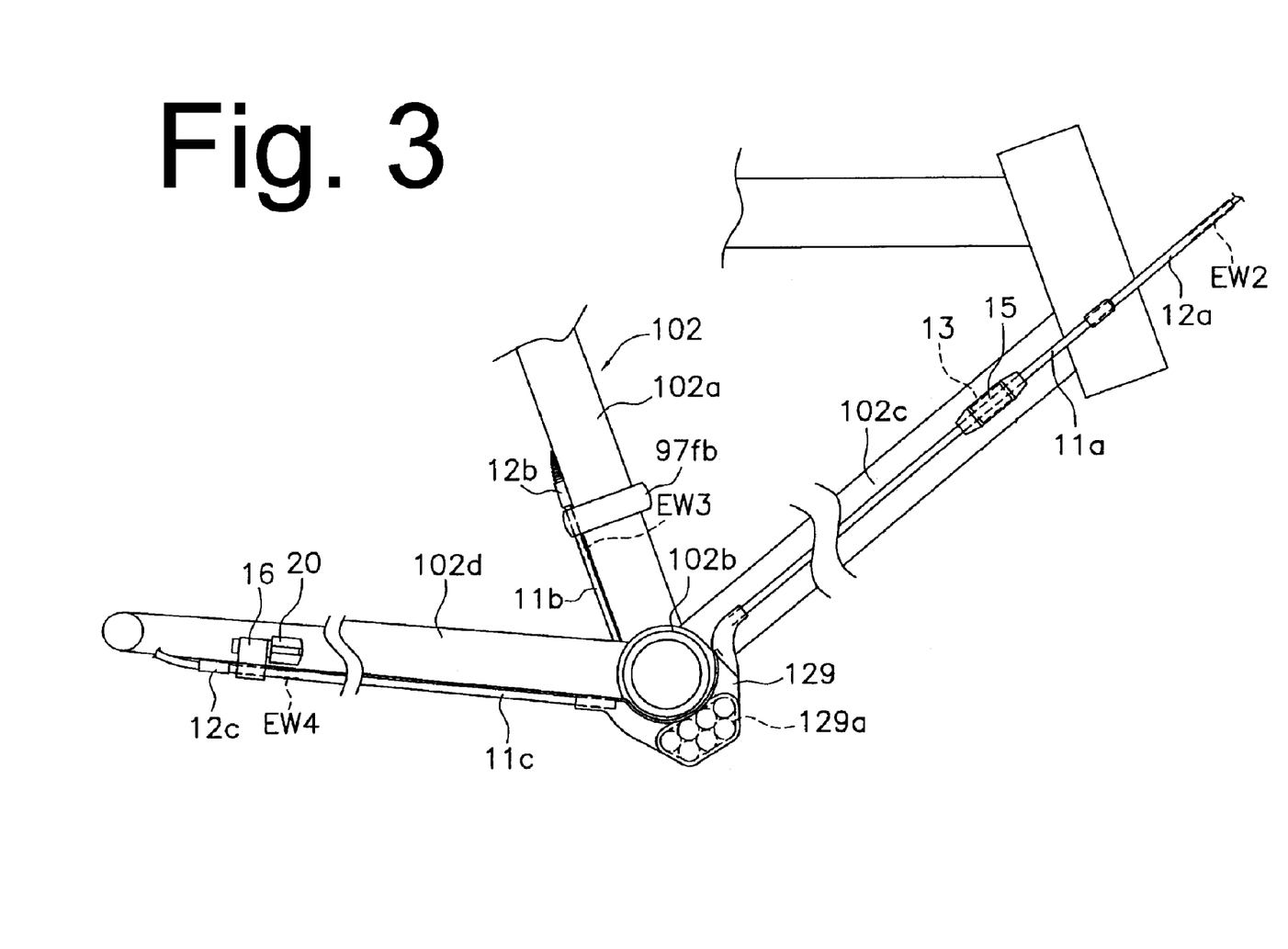
FIG. 3 is a side view of electrical wiring mounted to the bicycle frame.
Figure 4:
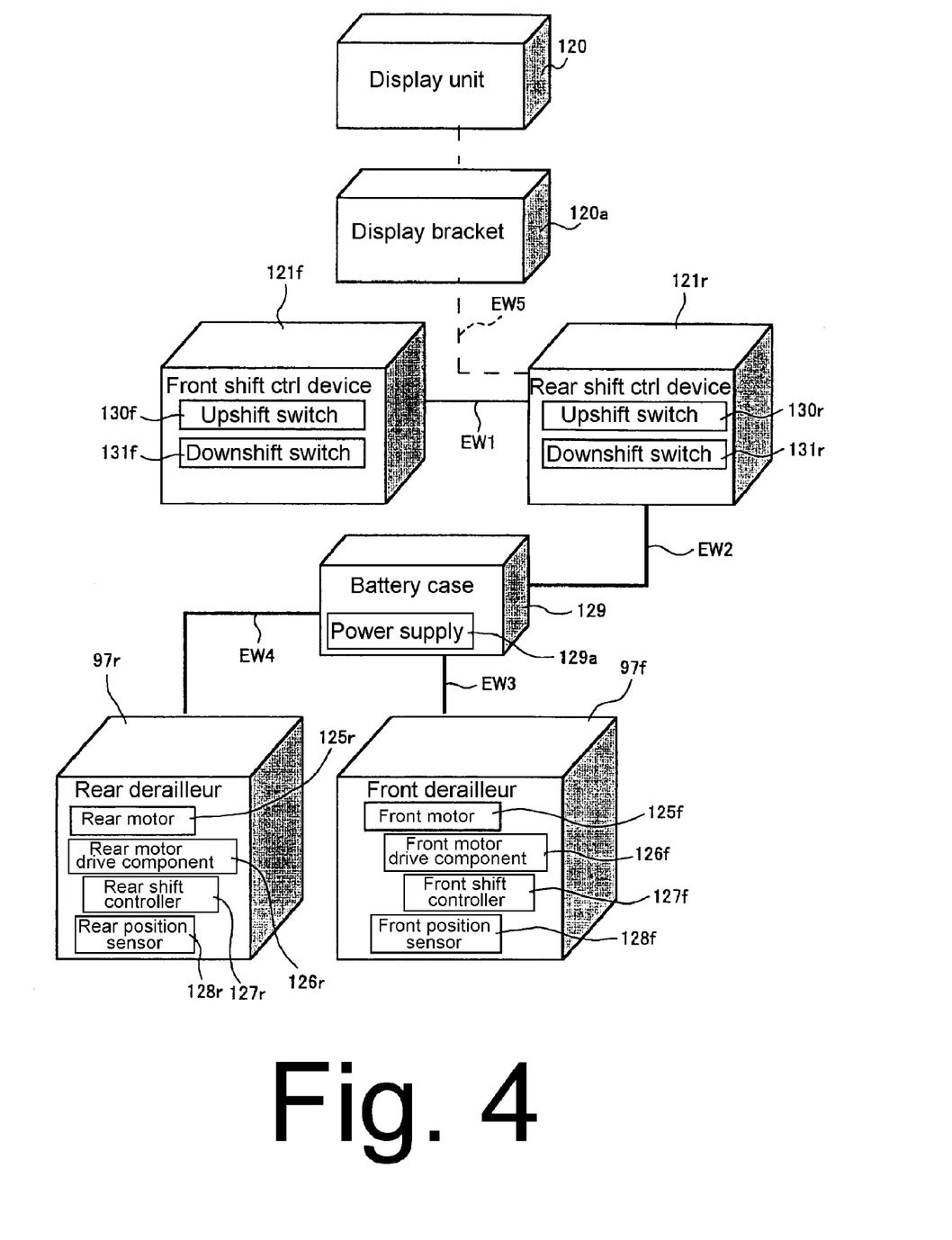
FIG. 4 is a block diagram of an electrically operated bicycle control system.

As shown in FIG. 4, front derailleur 97f comprises a front derailleur motor 125f, a front motor drive component 126f for driving front derailleur motor 125f, a front shift controller 127f comprising a programmed microprocessor and other electronic components for controlling the position of front derailleur 97f in response to signals received from front shift control device 121f, and a front position sensor 128f that senses the operating position of front derailleur 97f. Similarly, rear derailleur 97r comprises a rear derailleur motor 125r, a rear motor drive component 126r for driving rear derailleur motor 125r, a rear shift controller 127r comprising a programmed microprocessor and other electronic components for controlling the positioning of rear derailleur 97r in response to signals received from rear shift control device 121r, and a rear position sensor 128r that senses the operating position of rear derailleur 97r. A power source 129a in the form of a primary or secondary battery or some other power source is housed in a battery case 129 attached to the bottom bracket 102b (FIG. 3) of frame 102. Power source 129a powers front and rear derailleurs 97f and 97r as well as other electrical components described herein in a known manner.

As shown in FIGS. 1-4, front and rear derailleurs 97f and 97r, front and rear shift control devices 121f and 121r, display unit 120 and battery case 129 are mounted at various positions on bicycle 101 and are interconnected by five sets of electrical wiring EW1-EW5. Electrical wiring EW1 extends from front shift control device 121f to rear shift control device 121r, electrical wiring EW2 extends from rear shift control device 121r to battery case 129, electrical wiring EW3 extends from battery case 129 to front derailleur 97f, electrical wiring EW4 extends from battery case 129 to rear derailleur 97r, and electrical wiring EW5 extends from rear shift control device 121r to display unit bracket 120a.

In this embodiment, electrical wiring EW1 carries shift control signals from front shift control device 121f and may comprise a three wire cable that may be partially taped to handlebar 112. Electrical wiring EW2 carries shift control signals from front shift control device 121f and rear shift control device 121r as well as the operating position signals from front position sensor 128f and rear position sensor 128r. Electrical wiring EW2 may comprise a five or six wire cable. The portion of electrical wiring EW2 in proximity to rear brake lever assembly 113r may be partially taped to handlebar 112. Electrical wiring EW3 carries shift control signals from front shift control device 121f and front derailleur position signals from front position sensor 128f. Similarly, electrical wiring EW4 carries shift control signals from rear shift control device 121r and rear derailleur position signals from rear position sensor 128r. Each electrical wiring EW3 and EW4 may comprise a four wire cable. Electrical wiring EW5 carries front and rear derailleur position signals from front and rear position sensors 128f and 128r. Electrical wiring EW5 may comprise a five or six wire cable that may be partially taped to handlebar 112. Display unit 120 uses the signals received on electrical wiring EW5 to display the current operating position of front derailleur 97f and rear derailleur 97r to the rider.

FIG. 3 is a side view of electrical wiring EW2-EW4 mounted to frame 102. In this embodiment, electrical wiring EW2 is supported to a down tube 102c of frame 102 by a straight rigid first cover member 11a, a flexible and relatively soft second cover member 12a, a first coupler 13 and a cover apparatus 15, wherein a lower end portion of first cover member 11a is inserted into battery case 129. Electrical wiring EW3 is supported to seat tube 102a of frame 102 by a straight rigid first cover member 1b, a flexible and relatively soft second cover member 12b, and a front derailleur bracket 97fb, wherein a lower end portion of first cover member 11b is inserted into battery case 129. Electrical wiring EW4 is supported to a chain stay 102d of frame 102 by a straight rigid first cover member 11c, a flexible and relatively soft second cover member 12c, and a second coupler 16, wherein a forward end portion of first cover member 11c is inserted into battery case 129.

Figure 5:
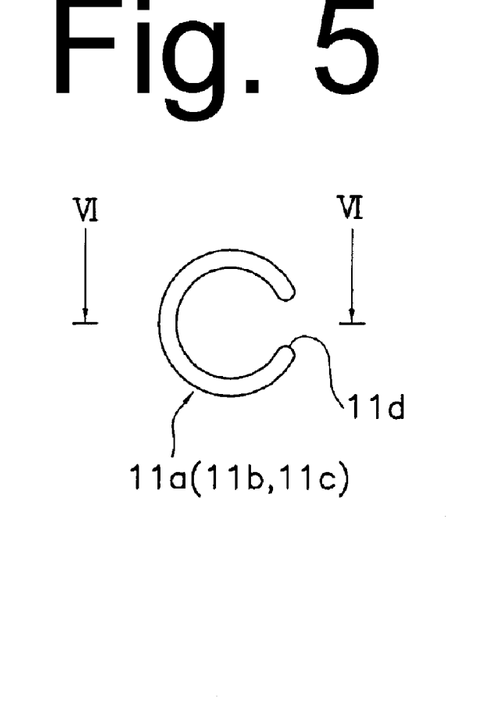
FIG. 5 is a front view of a particular embodiment of a first cover member.
Figure 6:
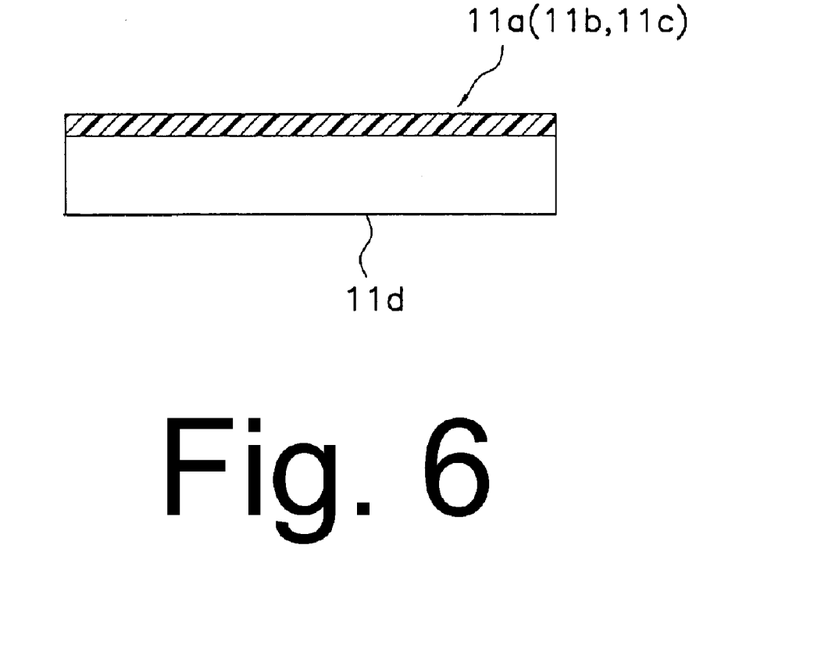
FIG. 6 is a view taken along line VI-VI in FIG. 5.

First cover members 11a-11c, which function as electrical wire covers, may be fabricated from a hard, relatively resilient, break-resistant material such as polyacetal resin. As shown in FIGS. 5 and 6, each first cover member 11a-11c has a generally cylindrical tubular shape and has a slot 11d extending along its entire length. As a result, each first cover member 11a-11c has a substantially C-shaped cross-section. Electrical wiring EW2-EW4 are supported within and substantially covered by their respective first cover members 11a-11c.

Figure 7:
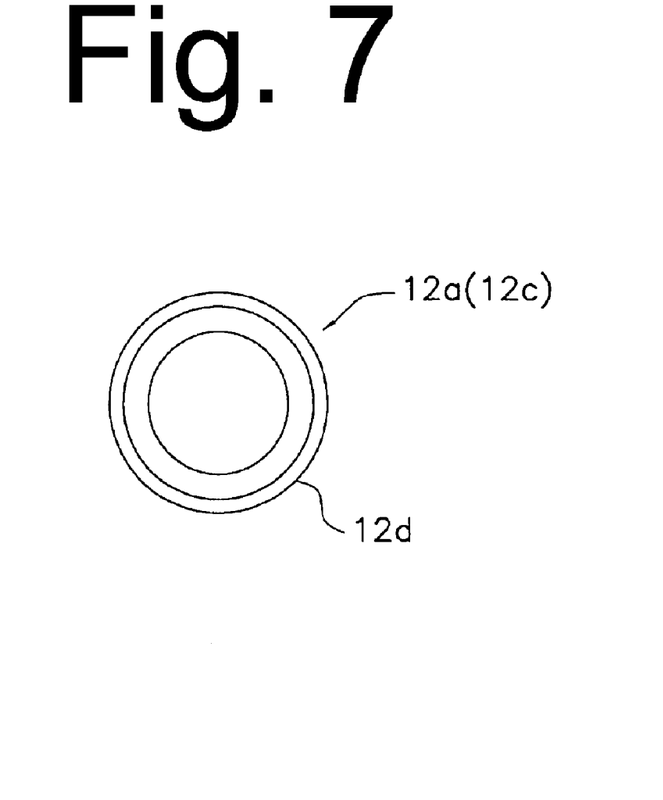
FIG. 7 is a front view of a particular embodiment of a second cover member.
Figure 8:
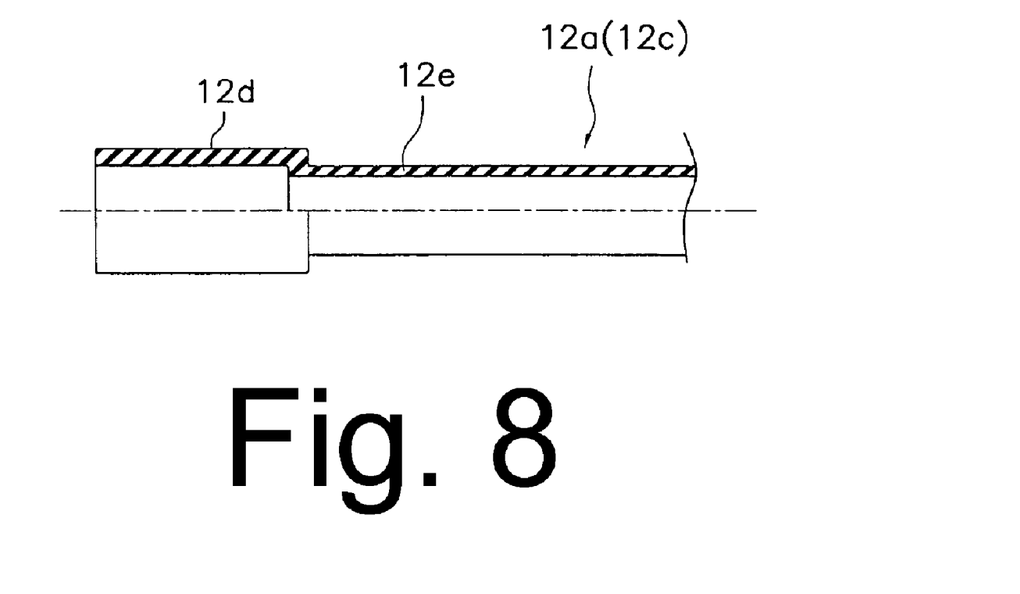
FIG. 8 is a partial cross-sectional view of the second cover member.

Each second cover member 12a-12c may be fabricated from a flexible and soft material such as a rubber synthetic resin. In this embodiment, second cover members 12a and 12c have the same construction. As shown in FIGS. 7 and 8, each second cover member 12a and 12c comprises a substantially cylindrical tubular attachment part 12d and a substantially cylindrical tubular extension part 12e. Attachment part 12d is structured to elastically attach around an end of its corresponding first cover member 11a and 11c, and extension part 12e extends from attachment part 12d. A diameter of extension part 12e is less than a diameter of attachment part 12d. Electrical wiring EW2 and EW4 are supported within and covered by their respective second cover members 12a and 12c.

Figure 9:
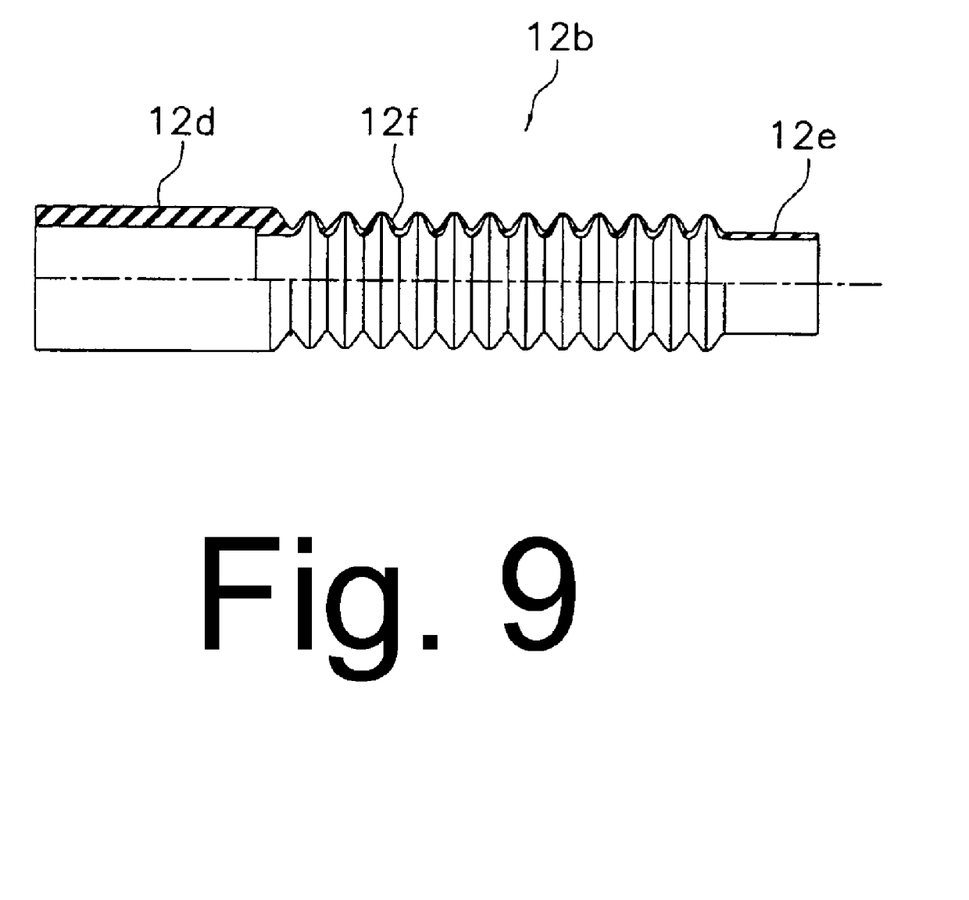
FIG. 9 is a partial cross sectional view of another embodiment of a second cover member.

Second cover member 12b also may be fabricated from a flexible and soft material, but it has a slightly different shape from second cover members 12a and 12c. As shown in FIG. 9, second cover member 12b comprises a substantially cylindrical tubular attachment part 12d and a substantially cylindrical tubular extension part 12e, wherein a diameter of extension part 12e is less than a diameter of attachment part 12d as in the first embodiment. However, in this embodiment, an undulating extension part 12f extends from attachment part 12d between attachment part 12d and extension part 12e. Electrical wiring EW3 is supported within and covered by second cover member 12b.

Figure 10:
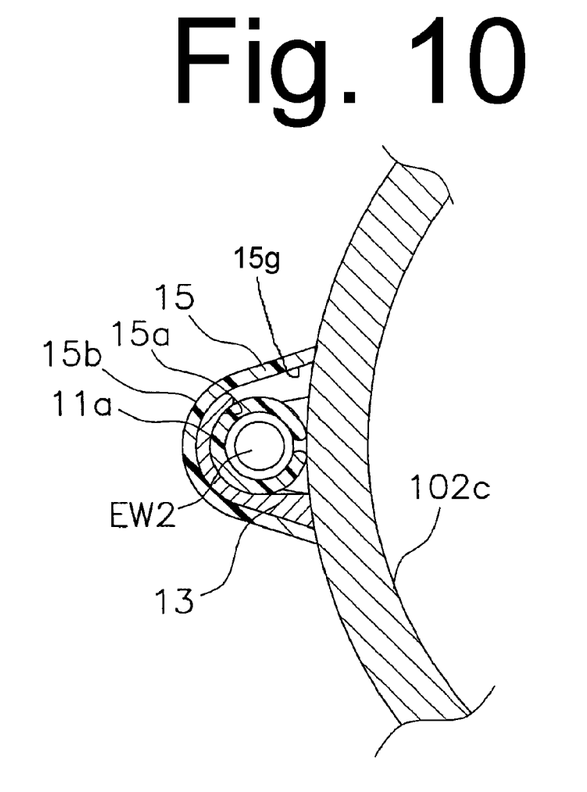
FIG. 10 is a cross sectional view of particular embodiments of relevant components of an electrical wire fixing and cover apparatus.
Figure 11:
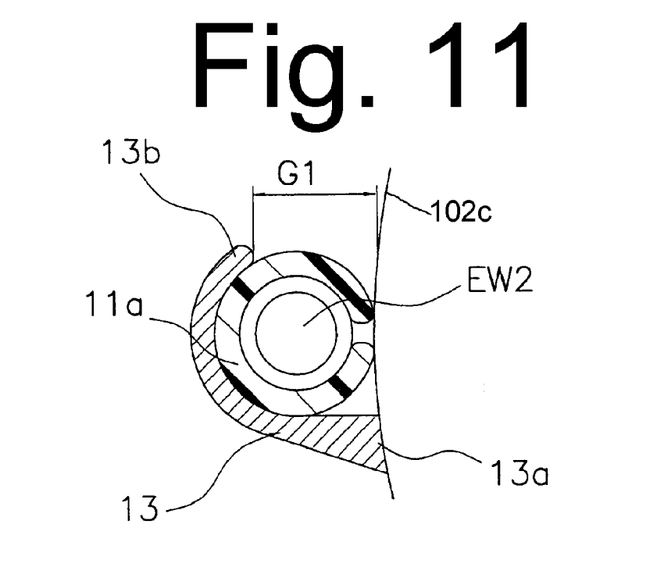
FIG. 11 is a more detailed view of components of the electrical wire fixing apparatus.

As shown in FIGS. 3, 10 and 11, the upper portion of first cover member 11a, which covers electrical wiring EW2, is attached to down tube 102c by first coupler 13 and cover apparatus 15. First coupler 13 is directly attached to down tube 102c, and it may be formed of metal such as aluminum base alloy, titanium or iron alloy. In this embodiment, first coupler 13 is approximately 10 mm to 20 mm long and extends parallel to the longitudinal direction of down tube 102c. As shown in FIG. 11, a base portion 13a of first coupler 13 is welded to down tube 102c and extends outwardly from down tube 102c. First coupler 13 then curves upward in a circular manner and terminates at a terminating edge 13b that is spaced apart from down tube 102c. First coupler 13 has a radius of curvature that is the same as or larger than a radius of curvature of first cover member 11a. Furthermore, a gap G1 between terminating edge 13b and down tube 102c is smaller than a diameter of the first cover member 11a. Normally (but not necessarily), first cover member 11a is not mounted to first coupler 13 through gap G1, but is inserted through the longitudinal end of first coupler 13. In any event, first coupler 13 can lock first cover member 11a essentially on three sides.

Figure 12:
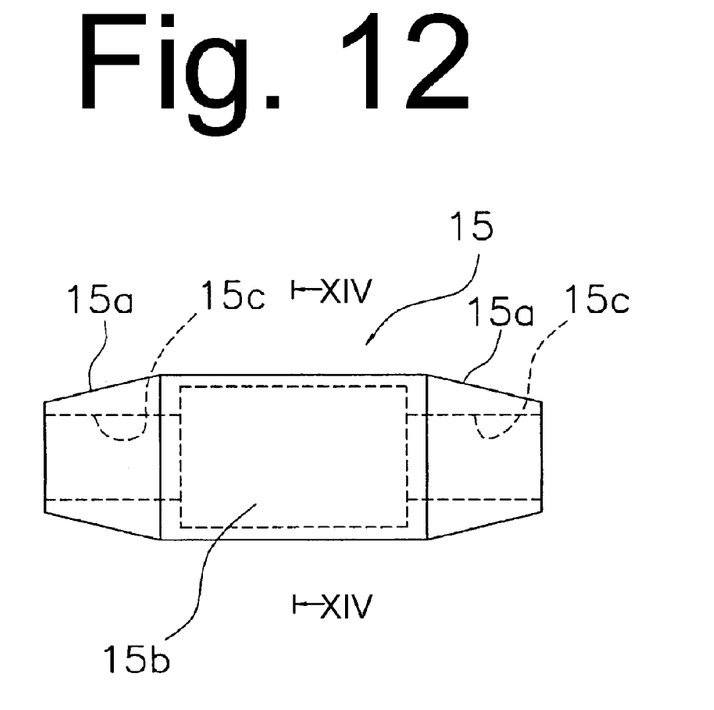
FIG. 12 is a top plan view of a particular embodiment of the electrical wire cover apparatus.
Figure 13:
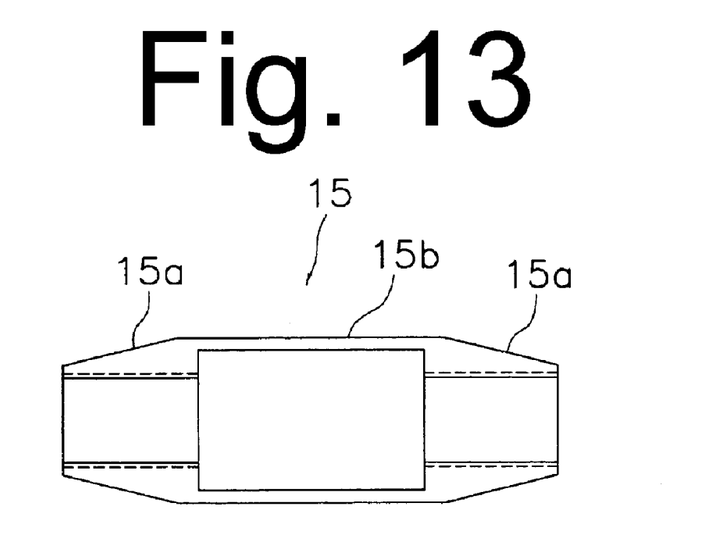
FIG. 13 is a bottom plan view of the electrical wire cover apparatus.
Figure 14:
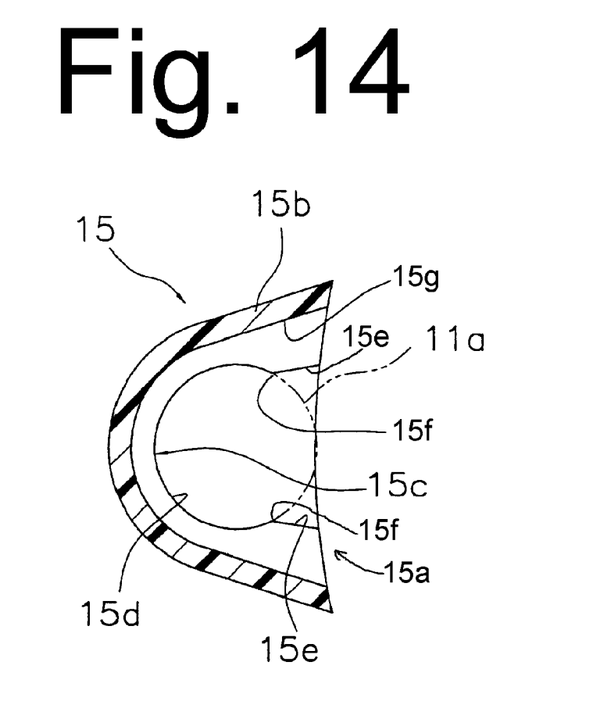
FIG. 14 is a view taken along line XIV-XIV in FIG. 12.

Cover apparatus 15 may be formed from a resin that is relatively hard, such as acrylonitrile-butadiene-styrene resin. In this embodiment, cover apparatus 15 covers the portion of electrical wiring EW2 and first cover member 11 a at first coupler 13 and also helps to prevent first cover member 11a from detaching from first coupler 13. As shown in FIGS. 12 and 13, cover apparatus 15 comprises a wire support cover member 15b and a pair of wire unit cover members 15a integrally disposed on opposite sides of wire support cover member 15b. The outer surface of each wire unit cover member 15a tapers in the longitudinal direction as shown in FIGS. 12 and 13. As shown in FIG. 14, wire support cover member 15b has a generally semicircular laterally outer section that widens as it progresses toward down tube 102c. Wire support cover member 15b has an inner peripheral surface 15g dimensioned to receive first coupler 13 therein as shown in FIG. 10. Inner peripheral surface 15g widens as it progresses toward down tube 102a to facilitate entry of first coupler 13 into wire support cover member 15b. The surface of wire support cover member 15b that contacts down tube 102c is curved to match the curvature of down tube 102a for a good fit.

Each wire unit cover member 15a also has a generally semicircular laterally outer section that widens as it progresses toward down tube 102c. However, each wire unit cover member 15a has a wire unit engaging unit 15c comprising a first inner peripheral surface 15d and a pair of second inner peripheral surfaces 15e. First inner peripheral surface 15d extends in a circular path for more than 180° with a radius of curvature the same as or slightly larger than a radius of curvature of first cover member 11a, and second inner peripheral surfaces 15e widen from opposite edges of first inner peripheral surface 15c, thereby forming locking units in the form of projections 15f. Thus, wire unit cover members 15a may be locked to first cover member 11a with wire support cover member 15b covering first coupler 13. The widening second inner peripheral surfaces 15e facilitate the entry of first cover member 11a past projections 15f to engage first inner peripheral surface 15c. The surfaces of wire unit cover members 15a that contact down tube 102c are curved to match the curvature of down tube 102a for a good fit. In this embodiment, wire support cover member 15a, wire unit cover members 15b and projections 15f form one piece.

To assemble electrical wiring EW2 to down tube 102a, electrical wiring EW2 is placed in first cover member 11a, and then first cover member 11a is inserted into first coupler 13 in the longitudinal direction of down tube 102c. Thereafter, wire support cover member 15b is placed over first coupler 13, and wire unit cover members 15a are placed over first cover member 11a on opposite sides of first coupler 13 such that second inner peripheral surfaces 15e contact first cover member 11a. Cover apparatus 15 then may be pressed toward down tube 102a so that first cover member 11a passes through projections 15f and engages first inner peripheral surface 15c with a snap fit. At that time, first coupler 13 is disposed at inner peripheral surface 15g of wire support cover member 15b. As a result, wire support cover member 15b helps prevent first cover member 11a from moving through gap G1, while wire unit cover members 15a retain first cover member 11a in the longitudinal direction of first coupler 13. All this is done while providing a compact, uncluttered and neat appearance.

Figure 15:
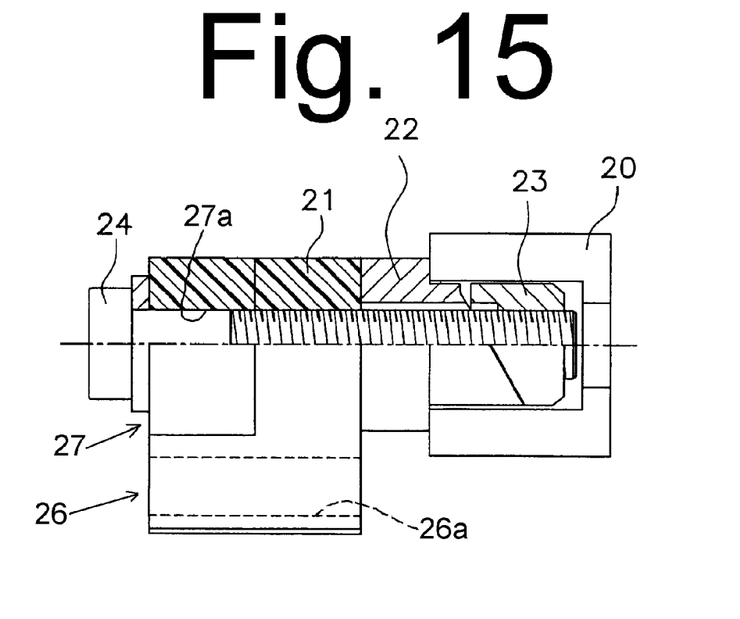
FIG. 15 is a cross sectional view of an embodiment of a coupler.

As shown in FIG. 3, the rear portion of first cover member 11c, which covers electrical wiring EW4, is attached to chain stay 102d by second coupler 16. Second coupler 16 is detachably fitted in a cable terminating component 20 ordinarily used for terminating the outer casing of a conventional Bowden cable. As shown in FIG. 15, second coupler 16 comprises a support member 21 for supporting first cover member 11c, a resilient taper ring 22 for attaching support member 21 to cable terminating component 20, a taper nut 23 that contacts the tapered surface of taper ring 22, and a fastener bolt 24. Fastener bolt 24 passes through support member 21 and taper ring 22 and screws into taper nut 23. When fastener bolt 24 is screwed into taper nut 23, taper ring 22 expands radially outward to secure second coupler 16 to cable terminating component 20, thereby attaching first cover member 11c to chain stay 102d.

Figure 16:
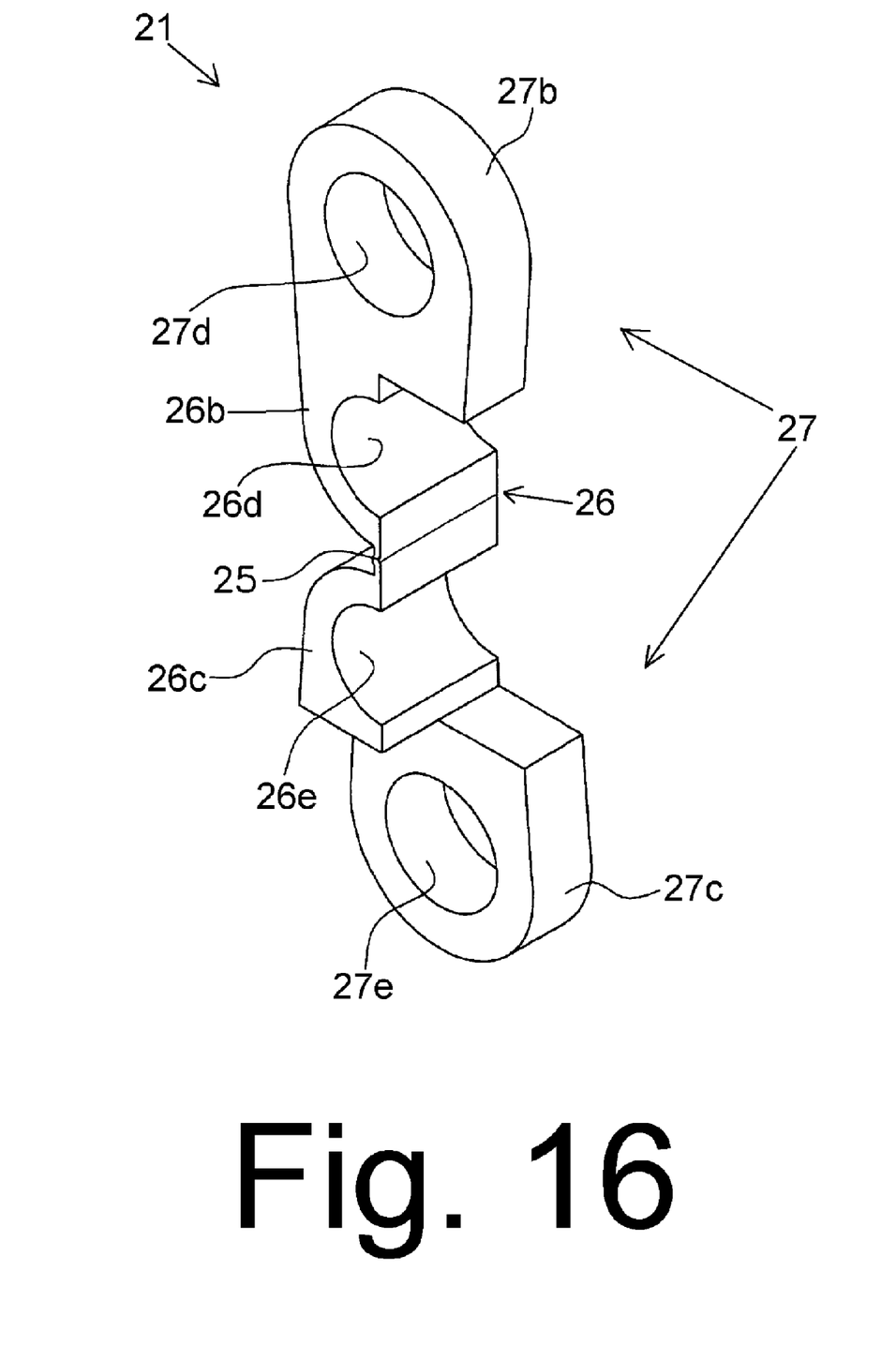
FIG. 16 is an oblique view of the support member shown in FIG. 15.

Support member 21 may be fabricated from a relatively soft synthetic resin such as polypropylene, for example, that is folded to produce the structure shown in FIG. 15. FIG. 16 shows support member 21 in its unfolded state. As shown in FIGS. 15 and 16, support member 21 comprises a central folding portion 25, a first portion 26 that forms a first cover member opening 26a, and a second portion 27 that forms a fastener opening 27a for receiving fastener bolt 24 therethrough. In this embodiment, a diameter of first cover member opening 26a is less than a diameter of first fastener opening 27a. Also, the diameter of first cover member opening 26a is slightly smaller than a diameter of first cover member 11c to firmly hold first cover member 11c.

First portion 26 comprises a first segment 26b and a second segment 26c, wherein first segment 26b folds relative to second segment 26c about central folding portion 25 to form first cover member opening 26a. First and second segments 26b and 26c have respective first and second concave surfaces 26d and 26e that face each other when support member 21 is in the folded state to form first cover member opening 26a. Second portion 27 comprises a first segment 27b and a second segment 27c, wherein first segment 27b folds relative to second segment 27c about central folding portion 25 to form first fastener opening 27a. First and second segments 27b and 27c have respective circular openings 27d and 27e formed therein. First and second segments 27b and 27c are disposed axially adjacent to each other when support member 21 is in the folded state so that openings 27d and 27e are aligned with each other to form first fastener opening 27a.

During operation of the bicycle, when front derailleur 97f is in the low-speed position, operating front shift control device 121f to turn on front upshift switch 130f causes an upshift signal to be communicated to battery case 129 through electrical wiring EW1 and EW2 and then to front derailleur 97f through electrical wiring EW3. Front shift controller 127f then provides signals to front derailleur motor drive component 126f to drive front derailleur motor 125f to move front derailleur 97f to the high speed position. Similarly, when front derailleur 97f is in the high-speed position, operating front shift control device 121f to turn on front downshift switch 131f causes a downshift signal to be communicated to front derailleur 97f through electrical wiring EW2 and EW3. Front shift controller 127f then provides signals to front derailleur motor drive component 126f to drive front derailleur motor 125f to move front derailleur 97f to the low speed position.

When rear derailleur 97r is in a lower-speed position, operating rear shift control device 121r to turn on rear upshift switch 130r causes an upshift signal to be communicated to battery case 129 through electrical wiring EW2 and then to rear derailleur 97f through electrical wiring EW4. Rear shift controller 127r then provides signals to rear derailleur motor drive component 126r to drive rear derailleur motor 125r to move rear derailleur 97r to a higher speed position. Similarly, when rear derailleur 97r is in a higher speed position, operating rear shift control device 121r to turn on rear downshift switch 131r causes a downshift signal to be communicated to rear derailleur 97r through electrical wiring EW2 and EW4. Rear shift controller 127r then provides signals to rear derailleur motor drive component 126r to drive rear derailleur motor 125r to move rear derailleur 97r to a lower speed position.

During the above operations, operating position signals from front and rear position sensors 128f and 128r are communicated to display unit 120 through electrical wiring EW2-EW5 as appropriate, and display unit 120 displays the current operating positions of front and rear derailleurs 97f and 97r.

It should be readily apparent from the above description that electrical wiring EW2-EW4 are disposed in a straight line along frame 102 by the rigid first cover members 11a-11c. The parts of electrical wiring EW2-EW4 that do not go along the frame 102 can be bent freely by the soft second cover members 12a-12c. As a result, electrical wiring EW2-EW4 do not sag and are not exposed to the outside, thus minimizing any reduction in visual appeal of the bicycle and minimizing risk of damage to the wires.

Figure 17:
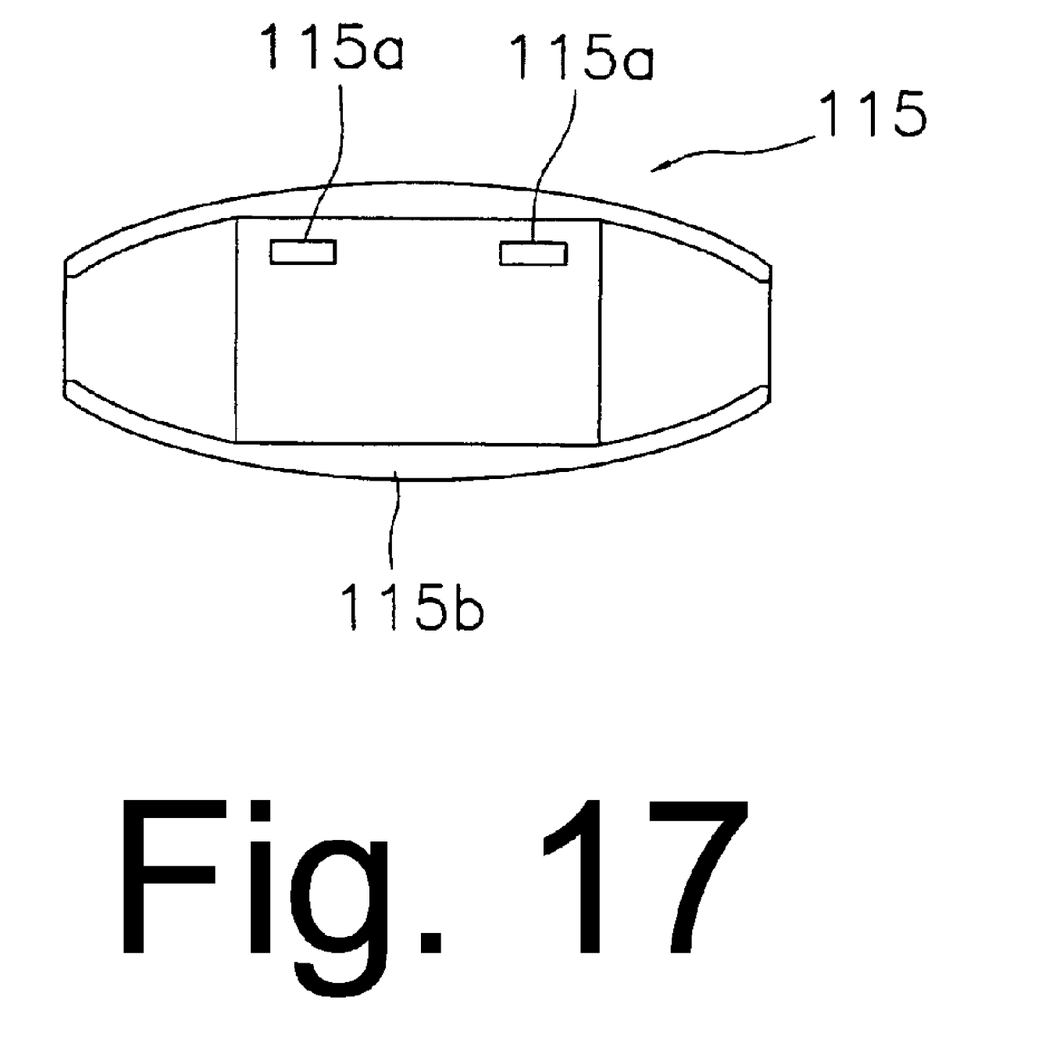
FIG. 17 is a bottom plan view of another embodiment of an electrical wire cover apparatus.
Figure 18:
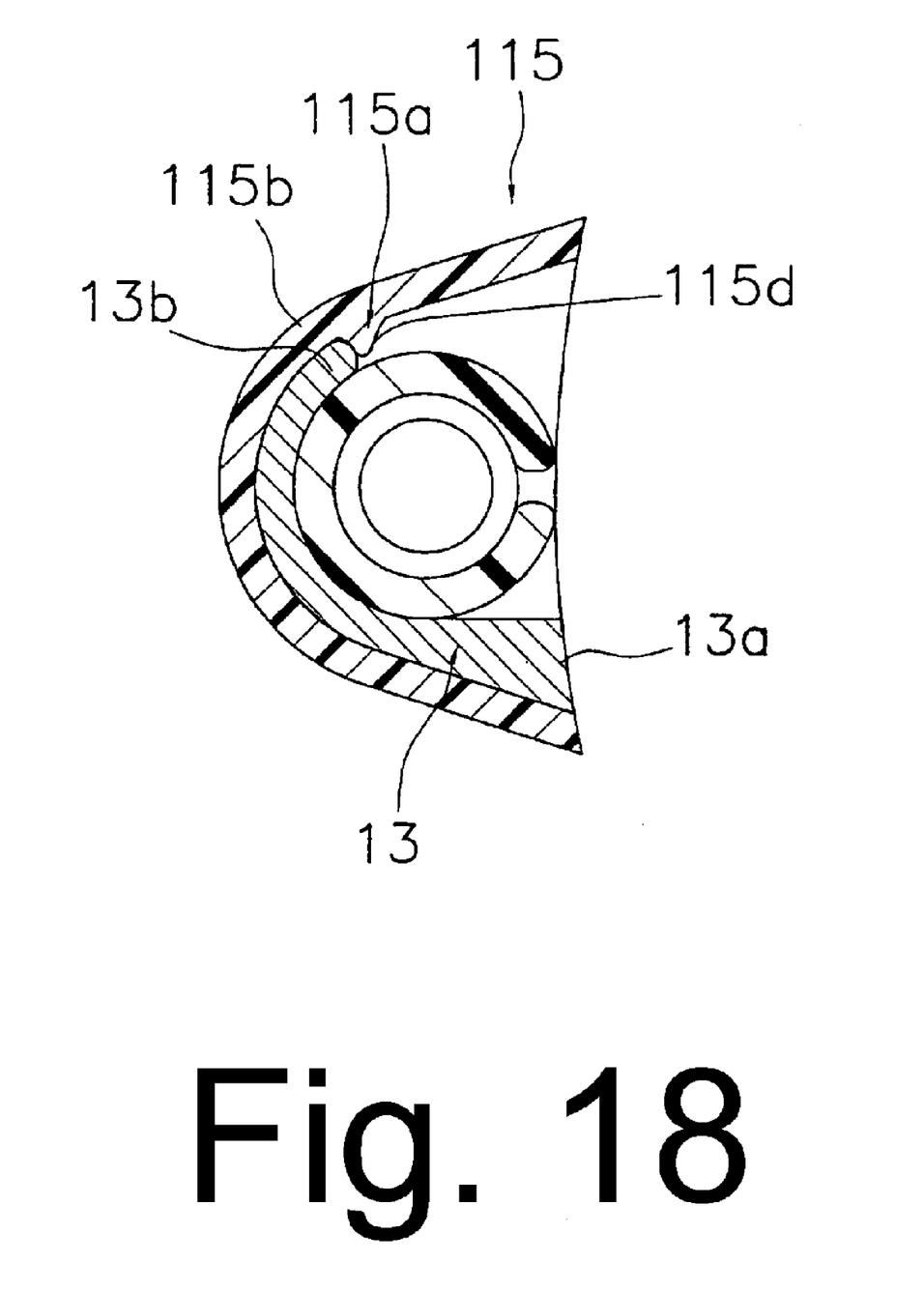
FIG. 18 is a cross sectional view of relevant components of an electrical wire fixing and cover apparatus that employs the cover apparatus shown in FIG. 17.

While the above is a description of various embodiments of inventive features, further modifications may be employed without departing from the spirit and scope of the present invention. For example, while cover apparatus 15 was locked on first cover member 11a, it may be locked on first coupler 13. FIGS. 17 and 18 are bottom and cross sectional views, respectively, of a cover apparatus 115 with a wire support cover member 115b that may be locked onto terminating edge 13b of first coupler 13. For this purpose, a locking unit in the form of projections 115a extends from the inner peripheral surface of wire support cover member 115b. Each projection 115a includes a locking convex part 115d that engages terminating edge 13b of first coupler 13. During assembly, cover apparatus 115 is placed over first coupler 13, and the locking convex parts 115d are elastically locked onto terminating edge 13b of first coupler 13 so that the bottom of wire support cover member 115b contacts down tube 102c. If desired, projections alternatively may be formed to pinch opposite longitudinal ends of first coupler 13.

While cover apparatus 15 in the first embodiment was locked on first cover member 11a, cover apparatus 15 may be directly locked on electrical wiring EW2 or on some other structure. Thus, an electrical wire unit can be considered electrical wiring alone or in combination with other structures. While a slot 11d extended axially along the entire length of the first cover members 11a-11c, slot 11d may be formed along only a portion of the length of first cover members 11a-11c. While first cover members 11a-11c were formed from a polyacetal resin, which is hard and tough, other materials may be used, such as metal or a carbon fiber reinforced resin. While second cover members 12a-12c were formed from a rubber synthetic resin, which is soft and flexible, other materials may be used, such as polyethylene and polypropylene. The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A bicycle electrical wire cover apparatus for covering an electrical wire unit that is coupled to a wire support disposed on a frame of a bicycle, wherein the apparatus comprises:

a wire support cover member structured to at least partially cover the wire support;

a locking unit integrally formed with the wire support cover member and structured to be locked to one of the wire support and the electrical wire unit; and a wire unit cover member coupled to the wire support cover member and structured to at least partially cover a portion of the electrical wire unit;

wherein the wire unit cover member extends in a lengthwise direction of the electrical wire unit away from the wire support cover member to at least partially cover a portion of the electrical wire unit away from the wire support.

2. The apparatus according to claim 1 wherein the locking unit is one piece with the wire support cover member.

3. The apparatus according to claim 1 wherein the locking unit is structured to be locked to the wire support.

4. The apparatus according to claim 3 wherein the locking unit extends from an inner peripheral surface of the wire support cover member.

5. The apparatus according to claim 3 wherein the locking unit is structured to be locked to a part of the wire support that extends outwardly from the frame of the bicycle.

6. The apparatus according to claim 1 wherein the wire unit cover member and the wire support cover member are one piece.

7. The apparatus according to claim 6 wherein the wire unit cover member, the wire support cover member and the locking unit are one piece.

8. The apparatus according to claim 1 wherein the locking unit is structured to be locked to the wire unit.

9. The apparatus according to claim 8 wherein the locking unit extends from an inner peripheral surface of the wire unit cover member.

10. The apparatus according to claim 8 wherein the wire unit cover member and the wire support cover member are one piece.

11. The apparatus according to claim 10 wherein the wire unit cover member, the wire support cover member and the locking unit are one piece.

12. The apparatus according to claim 8 wherein the electrical wire unit includes an electrical wire cover that covers a portion of electrical wire, and wherein the locking unit is structured to be locked to a part of the electrical wire cover.

13. The apparatus according to claim 12 wherein the wire unit cover member comprises a surrounding portion that extends more than 180° around the electrical wire cover.

14. The apparatus according to claim 13 wherein the locking unit comprises a projection disposed at each end of the surrounding portion.

15. A bicycle electrical wire cover apparatus for covering an electrical wire unit that is coupled to a wire support disposed on a frame of a bicycle, wherein the apparatus comprises:

a wire support cover member structured to at least partially cover the wire support; and a locking unit integrally formed with the wire support cover member and structured to be locked to one of the wire support and the electrical wire unit;

wherein the locking unit is structured to be locked to the wire support;

wherein the locking unit is structured to be locked to a part of the wire support that extends outwardly from the frame of the bicycle; and wherein the wire support curves around the wire unit and forms a terminating edge in the curving direction, and wherein the locking unit is structured to engage the terminating edge to lock the cover member to the wire support.

* * * * *